(12) United States Patent
Uppal et al.

(10) Patent No.: US 11,496,439 B1
(45) Date of Patent: Nov. 8, 2022

(54) STATELESS HIGH-CAPACITY NETWORK ADDRESS TRANSLATION SERVICE

(71) Applicant: Amazon Technologies, Inc., Seattle, WA (US)

(72) Inventors: Hardeep Singh Uppal, Seattle, WA (US); Junzhi Wang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/210,359

(22) Filed: Mar. 23, 2021

(51) Int. Cl.
| G06F 15/16 | (2006.01) |
| H04L 61/256 | (2022.01) |
| H04L 61/251 | (2022.01) |
| H04L 67/01 | (2022.01) |
| H04L 101/35 | (2022.01) |

(52) U.S. Cl.
CPC .......... *H04L 61/256* (2013.01); *H04L 61/251* (2013.01); *H04L 67/01* (2022.05); *H04L 2101/35* (2022.05)

(58) Field of Classification Search
CPC ... H04L 61/256; H04L 61/252; H04L 61/305; H04L 67/42; H04L 61/251; H04L 2101/35; H04L 67/01
USPC ................................................. 709/245–246
See application file for complete search history.

(56) References Cited

U.S. PATENT DOCUMENTS

| 9,929,951 | B1* | 3/2018 | Dickinson | H04L 61/2514 |
| 10,298,724 | B2* | 5/2019 | Albrecht | H04L 61/251 |
| 2004/0233916 | A1* | 11/2004 | Takeuchi | H04L 61/251 370/395.54 |
| 2011/0211581 | A1* | 9/2011 | Hamamoto | H04L 61/251 370/392 |
| 2012/0005299 | A1* | 1/2012 | Xu | H04L 61/251 709/208 |
| 2012/0259998 | A1* | 10/2012 | Kaufman | H04L 61/251 709/245 |
| 2013/0332584 | A1* | 12/2013 | Sun | H04L 61/251 709/219 |
| 2017/0346789 | A1* | 11/2017 | Maslak | H04L 67/18 |
| 2021/0126897 | A1* | 4/2021 | Kimn | H04L 61/251 |

* cited by examiner

*Primary Examiner* — Bharat Barot
(74) *Attorney, Agent, or Firm* — Knobbe Martens Olson & Bear LLP

(57) ABSTRACT

Systems and methods are described for communications between computing devices via a stateless high-volume network address translation ("NAT") service. The stateless high-volume NAT service manages high volumes of connections between networks by encoding at least part of the information needed to manage a connection in an encoded IPv6 address, which is then used by a NAT device or application as its sending address when relaying data from a source to a destination. The encoded IPv6 address may contain information such as the IPv4 address of the source, the IPv4 address of the destination, the protocol used to communicate, the source and destination ports, and the like. When the destination sends a response to the encoded IPv6 address, the NAT device decodes the IPv6 address to obtain the encoded information, and then uses that information to deliver the response to the source.

20 Claims, 6 Drawing Sheets

STATELESS HIGH-CAPACITY NETWORK ADDRESS TRANSLATION SERVICE

BACKGROUND

Computing devices can utilize communication networks to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, hosted computing environments or data processing centers, generally referred to herein as "data centers," may include a number of interconnected computing systems to provide computing resources to users of the data center. The data centers may be private data centers operated on behalf of an organization, or public data centers operated on behalf, or for the benefit of, the general public.

Companies and organizations that operate interconnected computer networks may provide services that facilitate inter-network connections. One example of such a service is a network address translation or "NAT" service, which may translate a network address that is use on one network to an address suitable for use on another network. NAT services may thus facilitate connections between networks.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
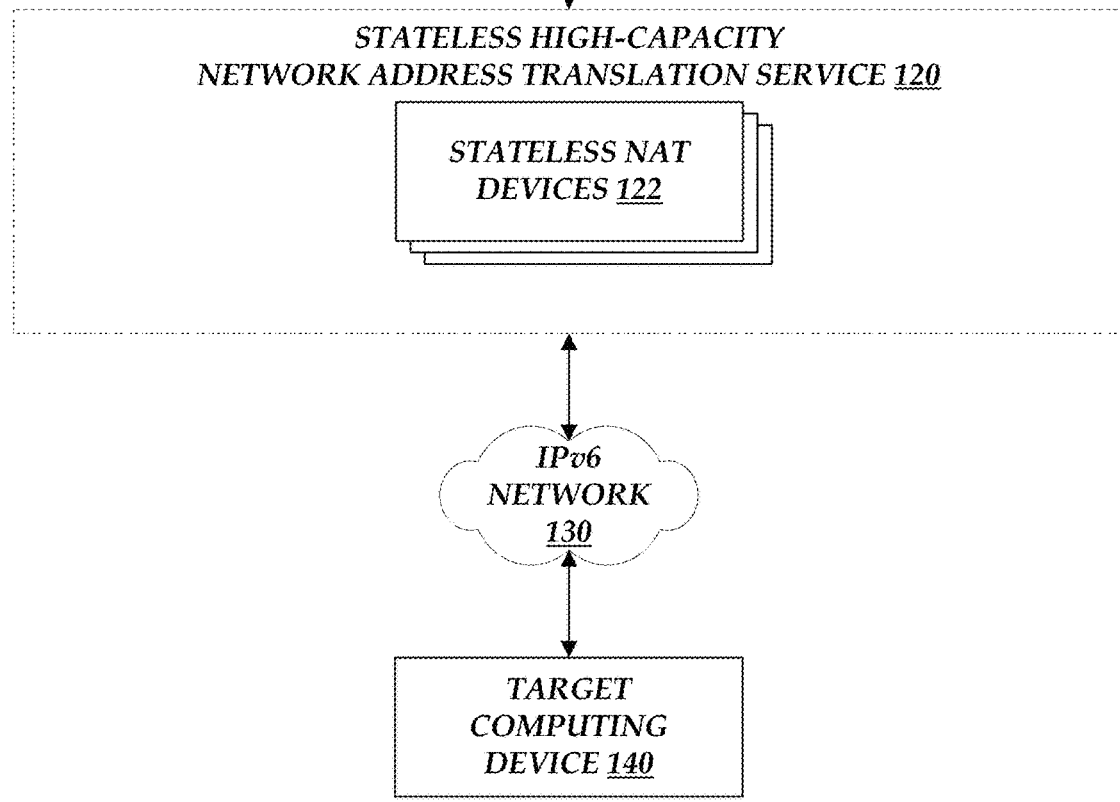
FIG. 1 is a block diagram depicting an example environment in which a stateless high-capacity network address translation service may facilitate communication between computing devices in accordance with aspects of the present disclosure.

Generally described, aspects of the present disclosure relate to computer networking. More specifically, aspects of the present disclosure are directed to systems, methods, and computer-readable media related to stateless high-capacity NAT services. In a typical application, a NAT service may be used to facilitate communication between two computer networks that each have their own separate address space. For example, a private network may use a particular subnet of the Internet Protocol version 4 ("IPv4") address space, such as addresses in the range 10.0.0.0 to 10.255.255.255, and may assign addresses within that space to individual devices on the private network. To connect a device on this private network with a device on a public network (e.g., the Internet), a NAT device may translate the private-network IPv4 address of the device (e.g., 10.0.1.14) to a public-network IPv4 address associated with the NAT device (e.g., 198.51.100.14). The NAT device may then proxy traffic between the private-network device and the Internet device by translating the IPv4 addresses, such that the private-network device communicates with the NAT device using its private-network IPv4 address, the Internet device communicates with the NAT device using its public IPv4 address.

A NAT device typically performs network address translation and proxying services for several devices simultaneously. The NAT device must therefore maintain a local store of information regarding the services it is currently providing, so that it can appropriately route incoming traffic from the public network to its intended destination on the private network. The NAT device may store, for example, that a device with the private IPv4 address 10.0.5.20 recently established a connection with a device with the public IPv4 address 203.0.113.71. The NAT device may then use this information to route messages received from the public IPv4 address 203.0.113.71 to the appropriate device on the private network.

IPv4 uses a 32-bit address space with over 4.29 billion unique addresses. IPv4 also organizes communications into logical endpoints known as "ports," and devices that communicate using IPv4 establish a connection from a particular port the source device to a particular port on the destination device (which may be referred to herein as a "target device"). IPv4 allows 65,636 ports per network address, which places an upper bound on the number of simultaneous connections that a NAT device can facilitate from a particular network address: In order to route communications to the correct endpoint, the information the NAT device uses to identify each connection (source IPv4 address, source port, destination IPv4 address, destination port, and communications protocol) must be unique for each connection it facilitates. In high-volume applications, this upper bound may be reached. The port-based upper bound can be mitigated by using more than one IPv4 address for a particular device, but allocating public IPv4 addresses is becoming increasingly difficult and expensive over time.

In addition to the upper bounds on available ports and IPv4 addresses, the computing resources consumed by a NAT device increase with the number of connections. Since it is undesirable for the NAT device to be a source of latency, the NAT device must be able to quickly access the information needed to route a particular connection. The NAT device must therefore store increasing amounts of information in memory as the number of connections it facilitates increases. Multiple NAT devices may be used to mitigate this problem and to provide redundancy, but these devices must then exchange information, which creates additional overhead and synchronization issues.

To overcome at least these limitations, a stateless high-capacity network address translation service may be used. As described herein, a stateless high-capacity network address translation service may facilitate high volumes of inter-network communications by using the 128-bit Internet Protocol version 6 ("IPv6") address space to store connection parameters, which may be encoded into an IPv6 address used by a NAT device and then decoded when the NAT device receives traffic at that IPv6 address. The service may thereby reduce the memory, time, and processing overhead associated with storing or tracking connection state information, since the information is stored in the IPv6 address itself rather than being maintained on the NAT device. The stateless high-capacity network address translation service may also handle a volume of connections in excess of the upper bounds described above, since the service may generate unique parameters for each connection without being limited by the available number of IPv4 ports or addresses. It will thus be understood that the stateless high-capacity network address translation service described herein addresses a technical problem that specifically arises in the realm of computer networks, and improves the performance of a NAT device when facilitating high volumes of inter-network connections.

Although examples are described herein with regard to stateless NAT devices and network address translation, it will be understood that the present disclosure is not limited to the encoding and decoding of network addresses or to providing NAT services. For example, some embodiments of the present disclosure implement stateless translations of application layer protocols, such as translating the Hyper-Text Transport Protocol to the QUIC protocol and vice versa. Other embodiments may implement stateless translations of transport layer protocols such as TCP and UDP, and may thereby reduce or eliminate overhead associated with encapsulation or tunneling of such protocols. In various embodiments, protocols may be translated with or without translation of network addresses.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

FIG. 1 is a block diagram of an example network environment 100. It will be understood that the network environment 100 may include more (or fewer) elements than those shown in FIG. 1. It is not necessary, however, that these other elements be shown to provide an enabling disclosure. In the example environment 100, a source computing device 102 and a target computing device 140 may communicate with each other via a stateless high-capacity network address translation service 120. The source computing device 102 communicates with the stateless high-capacity network address translation service 120 via an IPv4 network 110, and the target computing device 140 communicates with the stateless high-capacity network address translation service 120 via an IPv6 network 130.

The IPv4 network 110 may be any network that implements the IPv4 protocol, including any wired network, wireless network, or combination thereof. For example, the IPv4 network 110 may be a personal area network, local area network, wide area network, over-the-air broadcast network (e.g., for radio or television), cable network, satellite network, cellular telephone network, or combination thereof. As a further example, the IPv4 network 110 may be a publicly accessible network of linked networks, possibly operated by various distinct parties, such as the Internet. In some embodiments, the IPv4 network 110 may be a private or semi-private network, such as a corporate or university intranet. The IPv4 network 110 may include one or more wireless networks, such as a Global System for Mobile Communications (GSM) network, a Code Division Multiple Access (CDMA) network, a Long Term Evolution (LTE) network, or any other type of wireless network. The IPv4 network 110 can use protocols and components for communicating via the Internet or any of the other aforementioned types of networks. For example, the protocols used by the IPv4 network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein. The IPv6 network 130 may similarly be any network that implements the IPv6 protocol. Although FIG. 1 depicts an environment 100 in which IPv4 and IPv6 networks are used, it will be understood that the present disclosure is not limited to any particular networks or protocols, and that other networks and other protocols are within the scope of the present disclosure.

The source computing device 102 and target computing device 140 may generally be any computing devices that implement aspects of the present disclosure. Examples of such computing devices include a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, one or both of the source computing device 102 and target computing device 140 may be virtual computing devices, and may be instantiated in a hosted computing environment (e.g., a data center).

The example environment 100 further includes the stateless high-capacity network address translation service 120. As depicted, the stateless high-capacity network address translation service 120 includes a number of stateless NAT devices 122, which are described in more detail with reference to FIG. 5 and which implement aspects of the present disclosure as described in more detail below.

Figure 2:
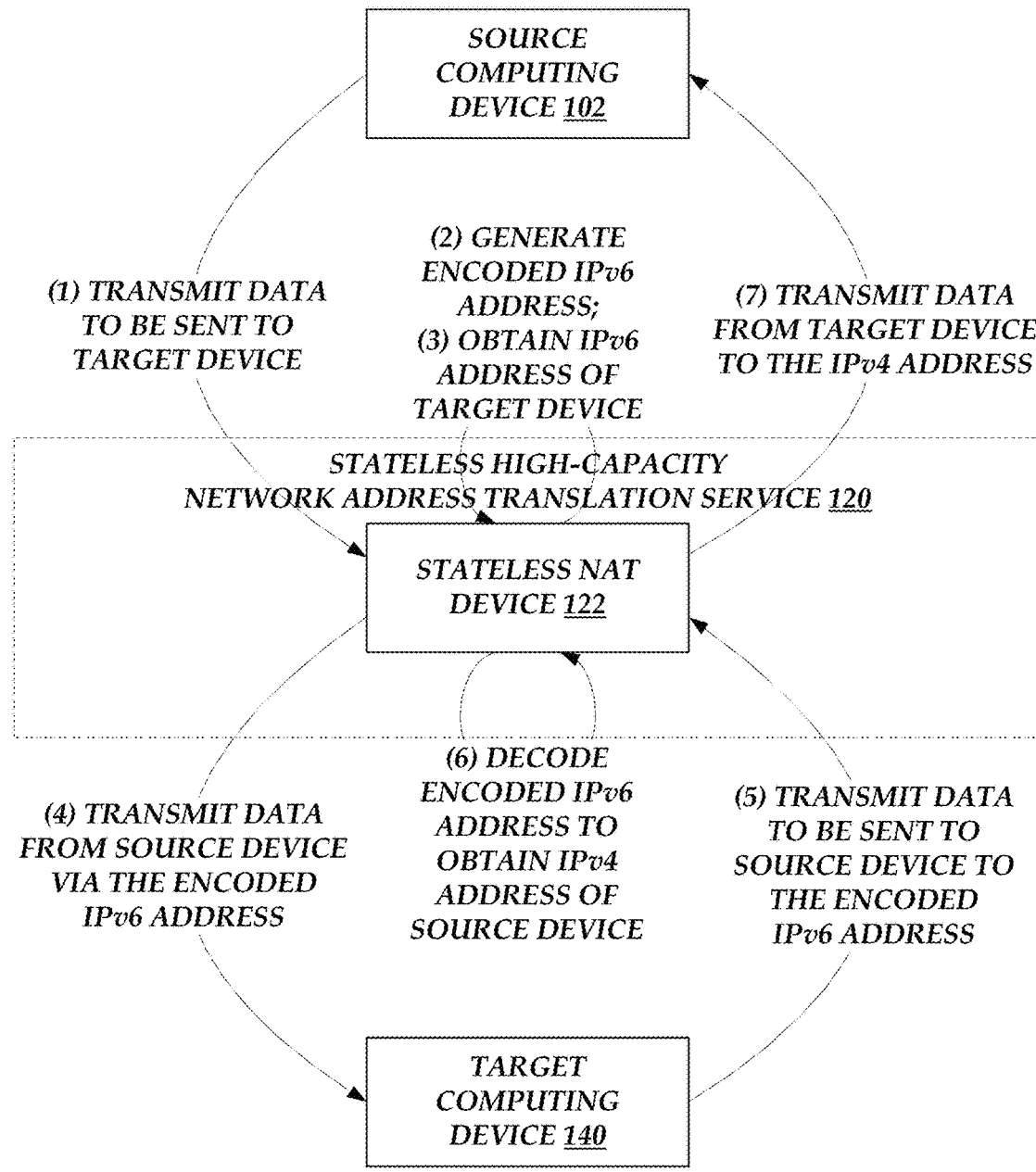
FIG. 2 is a flow diagram depicting example interactions between a stateless high-capacity network address translation service and communicating computing devices in accordance with aspects of the present disclosure.

FIG. 2 depicts example interactions for establishing data communications between a source computing device 102 and a target computing device 140 using a stateless high-capacity network address translation service 120 in accordance with aspects of the present disclosure. The example interactions begin at (1), where the source computing device 102 may transmit a request to establish communication with a target device (e.g., the target computing device 140) to a stateless NAT device 122 of the stateless high-capacity network address translation service 120. The request may illustratively include data to be sent to the target computing device 140, information identifying the source computing device 102, information identifying the target computing device 140, and other such information. In some embodiments, the request may specify a protocol to be used when communicating with the target computing device 140. In other embodiments, the protocol may be inferred based on the protocol used to transmit the request. Additionally, in some embodiments, the request to establish communication may be implicit and the source computing device 102 may simply transmit data and an indication of where to send it.

In some embodiments, the source computing device 102 may transmit its request to a particular stateless NAT device 122. For example, the source computing device 102 may transmit the request to an IPv4 address that is uniquely associated with the stateless NAT device 122. In other embodiments, the source computing device 102 may transmit its request to the stateless high-capacity network address translation service 120, which may implement anycast routing, load balancing, or other such techniques to deliver the request to a particular stateless NAT device 122.

At (2), the stateless NAT device 122 generates an encoded IPv6 address. As described in more detail below with reference to FIG. 3, the stateless NAT device 122 may generate an encoded IPv6 address that encodes all or part of the information needed to manage the requested data connection. For example, the stateless NAT device 122 may generate an encoded IPv6 address that includes one or more of a device-specific prefix identifying the stateless NAT device 122, the IPv4 address of the source computing device 102, the IPv4 address of the target computing device 140, the port number(s) used when communicating, and the protocol used when communicating. In some embodiments, the stateless NAT device 122 may encode various combinations of request characteristics when generating the encoded IPv6 address. For example, the stateless NAT device 122 may encode a value that identifies a particular protocol and port combination, or encode a value that identifies a particular IP address block rather than encoding the octets of the address block directly. In some embodiments, the stateless NAT device 122 may encode information from the transport layer or the application layer into the IPv6 address. For example, the stateless NAT device 122 may encode all or part of a stream identifier, source identifier, or other information that is contained in an application-layer or transport-layer protocol.

At (3), the stateless NAT device 122 obtains the IPv6 address of the target computing device 140. In some embodiments, the stateless NAT device 122 may obtain both the IPv4 and IPv6 addresses of the target computing device 140. For example, the request received at (1) may include a domain name of the target computing device 140, and the stateless NAT device 122 may obtain the IPv4 and IPv6 addresses of the target computing device 140 from a domain name server. In other embodiments, the request may include the IPv4 address of the target computing device 140 and the stateless NAT device 122 may use the IPv4 address to obtain the IPv6 address.

At (4), the stateless NAT device 122 transmits the data received from the source computing device 102 to the target computing device 140, using the encoded IPv6 address as the address from which the data is sent and the IPv6 address obtained at (3) as the destination address. Illustratively, a set of encoded IPv6 addresses that share the device-specific prefix may all resolve to the stateless NAT device 122, which may use these addresses to manage communications statelessly. For example, the stateless NAT device 122 may transmit data from multiple source computing devices 102 to the target computing device 140, and may use a different encoded IPv6 address for each distinct combination of source IPv4 address, source port, destination IPv4 address, destination port, and protocol. In some embodiments, the stateless NAT device 122 may manage connections by using different protocols or ports with the same encoded IPv6 address, and may thus distinguish different connections based on combinations of the encoded IPv6 address used, the port used, the protocol used, and so forth.

At (5), the target computing device 140 transmits a response to the source device. This response is sent to the stateless NAT device 122 at the encoded IPv6 address that was generated at (2) and used at (4). It will be understood that the target computing device 140 does not need to decode the encoded IPv6 address or obtain any of the encoded information, such as the IPv4 address of the source computing device 102, in order to communicate with the stateless NAT device 122 and thereby with the source computing device 102. From the perspective of the target computing device 140, communications with the source computing device 102 are sent and received via an IPv6 address that resolves to the stateless NAT device 122, and the target computing device 140 does not need to perform any special processing or handling with regard to the encoded IPv6 address.

At (6), the stateless NAT device 122 decodes the encoded IPv6 address to obtain all or some of the information needed to identify and communicate with the source computing device 102, such as the IPv4 address of the source computing device 102, the port used by the source computing device 102 to establish communication, the protocol used, and the like. Because this information is encoded in the IPv6 address, the stateless NAT device 122 does not need to store the information that was encoded, and does not need to retrieve it from memory or a storage device: Instead, the stateless NAT device 122 parses the encoded IPv6 address to re-obtain the information when it is needed (i.e., when traffic is received). In some embodiments, as discussed above, the stateless NAT device 122 may obtain some of the information needed to identify and communicate with the source computing device 102 from other sources. For example, the protocol to be used when communicating with the source computing device may be determined based on the protocol used by the target computing device 140 at (5), or the port to be used when communicating with the source computing device 102 may be determined based on the port used by the target computing device 140. In other embodiments, the stateless NAT device 122 may store a subset of state information, and then encode and retrieve the remainder from the encoded IPv6 address.

At (7), the stateless NAT device 122 transmits the response data to the IPv4 address of the source computing device 102, using the port and protocol that the source computing device 102 expects to receive. As with the target computing device 140, the use of an encoded IPv6 address is transparent to the source computing device 102: From the perspective of the source computing device 102, traffic is sent to and received from the IPv4 address of the stateless NAT device 122, and no interactions using IPv6 are required.

In some embodiments, the stateless NAT device 122 that performs the interactions at (5), (6), and (7) may be different than the one that performs the interactions at (1), (2), (3), and (4). For example, the stateless NAT device 122 may be one of a pool of stateless NAT devices, which in some embodiments may share use of a common IPv6 prefix and execute common routines (e.g., the routines 400 and 450 discussed below). Any member of the stateless NAT device pool may thus receive and decode an IPv6 address that was encoded by one of its peers.

It will be understood that FIG. 2 is provided for purposes of example, and that many variations on the depicted interactions are within the scope of the present disclosure. For example, the interactions at (2) and (3) may be carried out in either order or in parallel. As a further example, the interactions at (5), (6), and (7) may be omitted or carried out separately from the interactions at (1), (2), (3), and (4). FIG. 2 is thus understood to be illustrative and not limiting.

Figure 3:
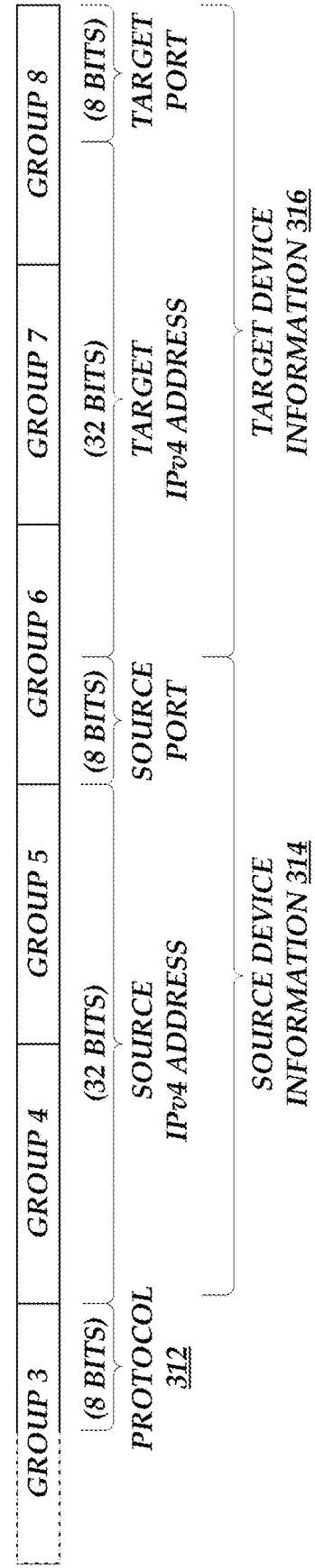
FIG. 3 is a pictorial diagram depicting an example IPv6 address encoding format that may be used by a stateless high-capacity network address translation service in accordance with aspects of the present disclosure.

FIG. 3 is a pictorial diagram depicting an example format of an encoded IPv6 address 300. For ease of depiction, the IPv6 address 300 is divided into 8 logical bit groups, each corresponding to 16 of the 128 bits of the network address.

In various embodiments, information may be encoded into the IPv6 address 300 and represented by the values of bits in the address. For example, as shown in FIG. 3, the first 40 bits of the IPv6 address 300 may be used to represent a device-specific routing prefix 302. Although referred to herein as a "device-specific" routing prefix, in some embodiments the routing prefix 302 may be shared by a number of devices. For example, a pool of stateless NAT devices may share a common routing prefix 302, such that any member of the pool may receive communications at the encoded IPv6 address 300 (e.g., by using anycast routing) and decode the IPv6 address 300 to obtain information regarding the communication state. In some embodiments, a common routing prefix 302 may be associated with a particular data center, point of presence in a content delivery network, or other group of computing devices. It will be understood that the 40-bit routing prefix 302 is provided for purposes of example, and that a routing prefix 302 of any length is within the scope of the present disclosure.

The encoded IPv6 address 300 may further include encoded data 310, which represents all or part of the information needed to manage a connection between computing devices. As illustrated in FIG. 3, 88 bits of the encoded IPv6 address 300 are used to store the encoded data 310. The encoded data 310 may include, for example, the protocol 312 used when making the connection, source device information 314 including a source IPv4 address and source port, and target device information 316 including a target IPv4 address and target port. In various embodiments, the encoded data 310 may include more or less information that the fields depicted in FIG. 3, or may use more or fewer bits to encode the fields. For example, the source port may be encoded directly as a 16-bit value, such that the actual port number is stored in the IPv6 address 300. As a further example, a table of the 256 most commonly used ports may be used to encode the source port, such that an encoded value of "0" may represent port 80, an encoded value of "1" may represent port 22, and so forth. As a still further example, a single value representing both the source port and the target port (which may or may not be identical) may be encoded. Similarly, in some embodiments, the source IPv4 address or the target IPv4 address may be stored directly as a 32-bit value (i.e., the four octets of the address may be stored), encoded using a table or database of IPv4 addresses, stored as a hash value, or otherwise encoded in a manner that allows later decoding.

While the encoded data 310 depicted in FIG. 3 is encoded into fields that correspond to the logical bit groups of the IPv6 address 300 for ease of depiction, it will be understood that any arbitrary number of bits may be used to encode data fields and that encodings do not need to correspond to all or part of a logical bit group. It will also be understood that the encoded IPv6 address 300 is provided for purposes of example, and that many variations on the encoded IPv6 address 300 are within the scope of the present disclosure. For example, the encoded IPv6 address 300 may include more or fewer fields than those depicted in FIG. 3, vary the size of the fields, include the fields in a different order, or omit all or some of the fields.

Figure 4A:
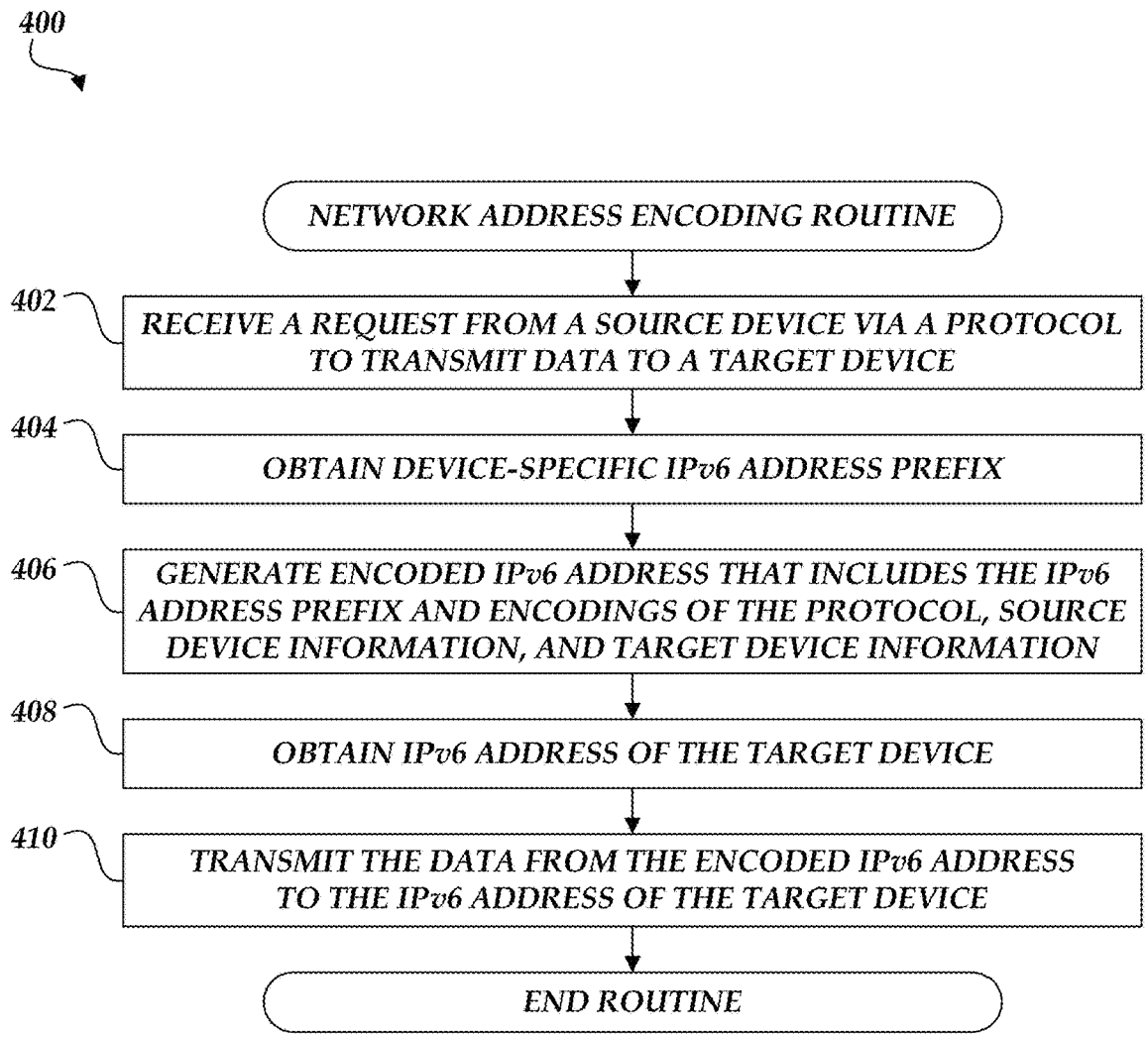
FIGS. 4A and 4B are flowcharts depicting example routines for encoding and decoding IPv6 addresses, which may be carried out by a stateless high-capacity network address translation service in accordance with aspects of the present disclosure.

FIG. 4A is a flowchart depicting an example routine 400 for encoding a network address in accordance with aspects of the present disclosure. The network address encoding routine 400 may be carried out, for example, by a component of the stateless NAT device 122 depicted in FIG. 1 (e.g., the IPv6 address encoder module 524 depicted in FIG. 5). The routine 400 begins at block 402, where a request may be received from a source device (e.g., the source computing device 102 depicted in FIG. 1) to establish communications with a target device (e.g., the target computing device 140). In some embodiments, as discussed above, the request may include data to be transmitted and may specify a communications protocol to be used. In other embodiments, the request may be transmitted using a particular communications protocol rather than the protocol being specified in the request. In other embodiments, as discussed above, the request may be implicit and the source device may simply transmit data and an indication of the target device.

At block 404, a device-specific IPv6 address prefix may be obtained. In some embodiments, as described above, the device-specific IPv6 address prefix may uniquely identify the computing device that is carrying out the routine 400. In other embodiments, the prefix may identify a pool of stateless NAT devices that proxy connections between computing devices, and each device in the pool may carry out the routine 400 to encode network addresses.

At block 406, an encoded IPv6 address may be generated. Illustratively, the encoded IPv6 address may be generated in a format similar to that depicted in FIG. 3, in which specified bits of the IPv6 address represent encodings of various parameters used to manage the connection between the source device and the target device. For example, the encoded IPv6 address may include the device-specific prefix obtained at block 404 as well as encodings of the IPv4 address of the source device, the port used by the source device, the protocol used by the source device, the IPv4 address of the target device, the port to be used to communicate with the target device, or various combinations thereof. In some embodiments, the value of a parameter may be represented directly as a series of bits in the IPv6 address. For example, a request to communicate via port 554 of the target device may be represented as the series of bits 0000001000101010 or the hexadecimal group "022A" in the encoded IPv6 address. As a further example, the source IP address 203.0.113.7 may be encoded as the hexadecimal octets "CB00:7107" in the encoded IPv6 address. In other embodiments, parameter values may be encoded in the IPv6 address using a lookup table, hashing function, compression algorithm, or other technique.

At block 408, an IPv6 address of the target device may be obtained. In some embodiments, the IPv6 address may be obtained by querying a domain name server with a domain name or an IPv4 address of the target device. In other embodiments, the IPv6 address of the target device may be provided in the request, in which case it may not be necessary to encode an address of the target device in the encoded IPv6 address.

At block 410, the data received from the source device at block 402 may be transmitted from the encoded IPv6 address to the IPv6 address of the target device. In some embodiments, as discussed above, the stateless NAT device or other device carrying out the routine 400 does not retain some or all of the information that was encoded into the encoded IPv6 address: Because that information is encoded in the IPv6 address, the stateless NAT device need not store the information (or the encoded IPv6 address) once it has carried out block 410. Instead, the stateless NAT device may re-obtain the information from the encoded IPv6 address at a later time, if and when that address is used. The stateless NAT device thereby reduces the amount of memory or storage consumed when handling large volumes of requests, and may have capacity to handle a higher volume of requests as a result. In some embodiments, as discussed above, the data received from the source device may be transmitted using different network protocol(s) than those used by the source device, and the encoded IPv6 address may subsequently be used to obtain information regarding the protocol(s) originally used. For example, the data received from the source device may be sent using HTTP over TCP, and may be sent to the target device using QUIC over UDP. In various embodiments, such protocol translations may be performed in addition to network address translation or instead of network address translation.

It will be understood that FIG. 4A is provided for purposes of example, and that many variations on the routine 400 are within the scope of the present disclosure. For example, block 404 may be carried out at any time prior to block 406, and in some embodiments may be carried out prior to any executions of the routine 400 rather than being carried out as part of the routine 400. As a further example, block 408 may be carried out at any time after block 402, and may include obtaining the IPv4 address of the target device (which may then be used when generating the encoded IPv6 address at block 406). FIG. 4A is thus understood to be illustrative and not limiting.

Figure 4B:
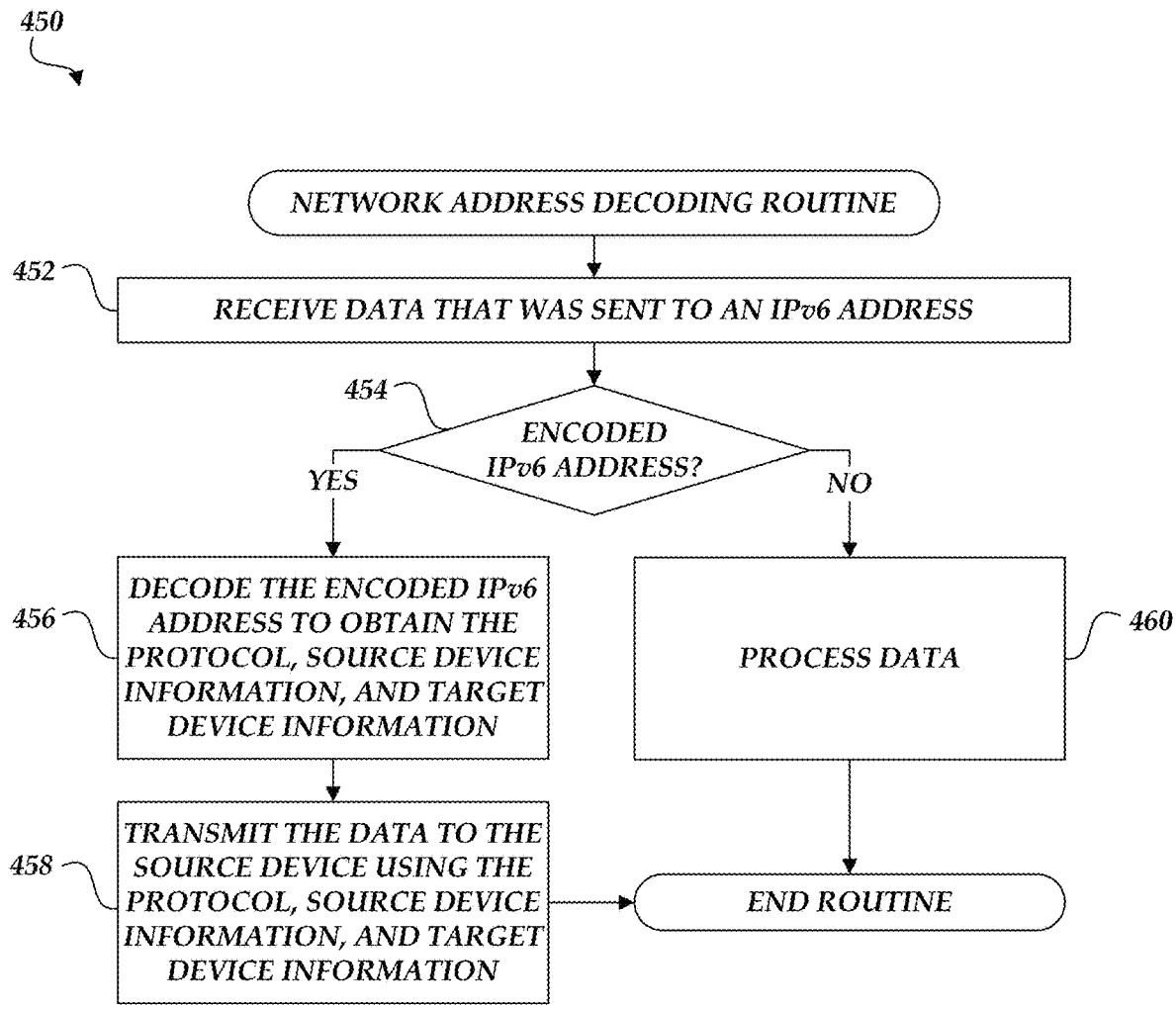

FIG. 4B is a flowchart depicting an example routine 450 for decoding a network address in accordance with aspects of the present disclosure. The network address decoding routine 450 may be carried out, for example, by a component of the stateless NAT device 122 depicted in FIG. 1 (e.g., the IPv6 address decoder module 526 depicted in FIG. 5). The routine 450 begins at block 452, where data may be received at an IPv6 address. Illustratively, the data may be a response from a target device that received data during a previous execution of the routine 400 depicted in FIG. 4A.

At decision block 454, a determination is made as to whether the IPv6 address at which the data was received is an encoded IPv6 address. In some embodiments, an encoded IPv6 address may be identified by determining whether it begins with a device-specific IPv6 prefix, as described in more detail above. In other embodiments, an encoded IPv6 address may be identified based on other characteristics of the IPv6 address. If the determination at decision block 454 is that the IPv6 address is not an encoded IPv6 address, then the routine 450 branches to block 460, where the received data may be processed and routed in accordance with conventional routing techniques.

If the determination at decision block 454 is that the IPv6 address at which the data was received is an encoded IPv6 address, then at block 456 the encoded IPv6 address may be decoded. Illustratively, decoding the IPv6 address reverses the encoding process and thereby re-obtains the parameter values that were encoded, such as the IPv4 address of the source device, the protocol used, port information, and other such parameters. In some embodiments, decoding may require use of a lookup table, reverse hashing function, or other technique that recovers the encoded parameter values.

At block 458, the parameter values obtained from decoding the encoded IPv6 address may be used to route the data that was received at block 452. Illustratively, the device carrying out the routine 450 may transmit the data to the source device at the obtained source IPv4 address on the source port using the protocol, and may present this data as having been transmitted from the IPv4 address of the target device. The process of encoding and decoding parameters in an IPv6 address may thus be performed without affecting how communications are presented to the source device.

It will be understood that FIG. 4B is provided for purposes of example, and that many variations on the routine 450 are within the scope of the present disclosure. For example, blocks 452 and 454 may be combined, such that a determination is made as to whether data was received at an encoded IPv6 address. As a further example, in some embodiments, some of the information used to manage communication between devices may be obtained from sources other than the encoded IPv6 address. For example, the IPv4 address of the target device may be obtained using a domain name server. FIG. 4B is thus understood to be illustrative and not limiting.

Figure 5:
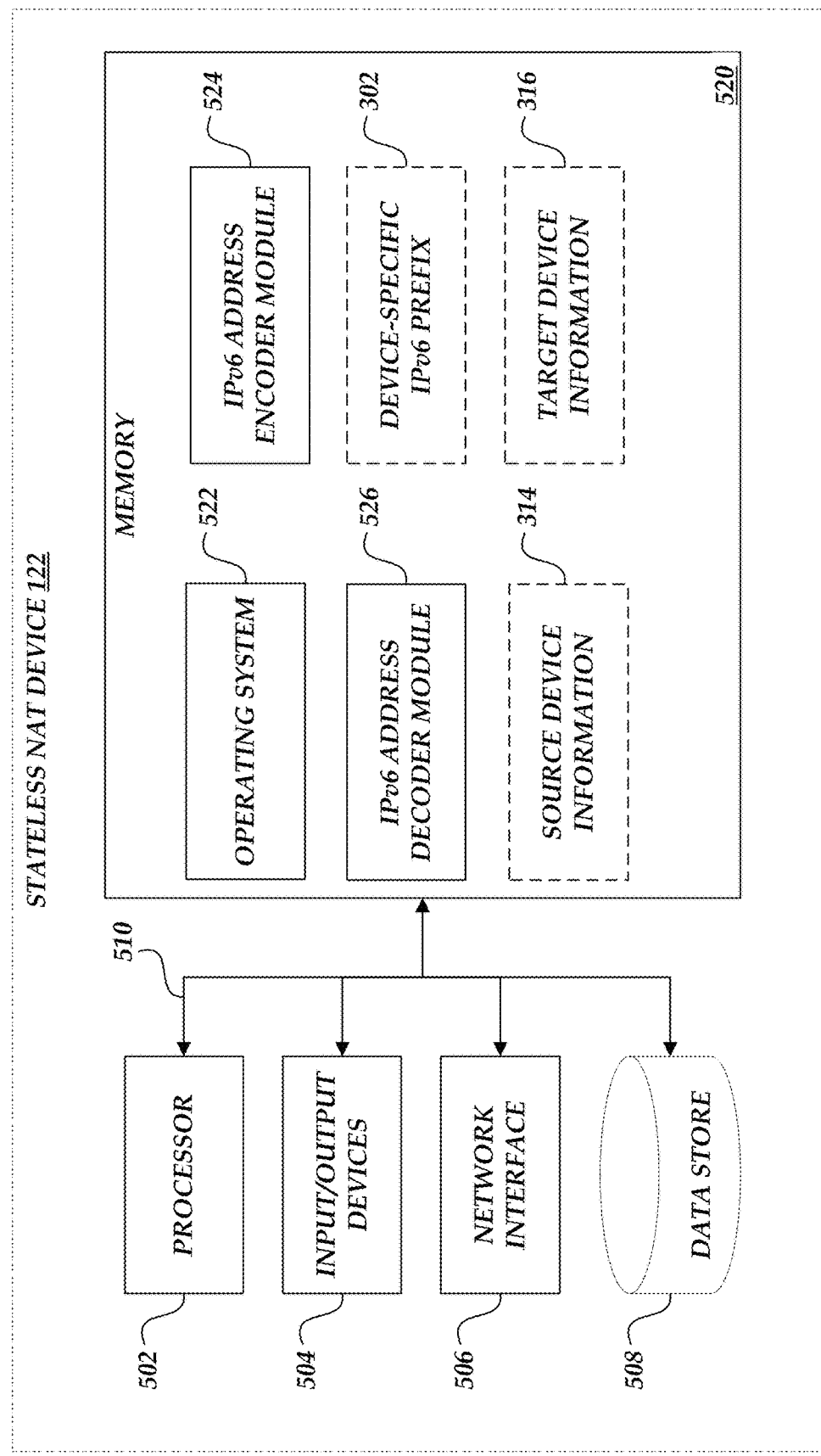
FIG. 5 depicts a general architecture of a computing device that is used by stateless high-capacity network address translation service to perform aspects of the present disclosure.

FIG. 5 depicts a general architecture of a computing system, referenced as a stateless NAT device 122, that operates to statelessly translate network addresses in accordance with aspects of the present disclosure. The general architecture of the stateless NAT device 122 depicted in FIG. 5 includes an arrangement of computer hardware and software modules that may be used to implement aspects of the present disclosure. The hardware modules may be implemented with physical electronic devices, as discussed in greater detail below. The stateless NAT device 122 may include many more (or fewer) elements than those shown in FIG. 5. It is not necessary, however, that all of these generally conventional elements be shown in order to provide an enabling disclosure. Additionally, the general architecture illustrated in FIG. 5 may be used to implement one or more of the other components illustrated in FIG. 1.

The stateless NAT device 122 includes a processor 502, input/output device interfaces 504, a network interface 506, and a data store 508, all of which may communicate with one another by way of a communication bus 510. The network interface 506 may provide connectivity to one or more networks or computing systems. The processor 502 may thus receive information and instructions from other computing systems or services via, e.g., the IPv4 network 110 and IPv6 network 130 depicted in FIG. 1. The processor 502 may also communicate to and from a memory 520 and further provide output information for an optional display (not shown) via the input/output device interfaces 504. The input/output device interfaces 504 may also accept input from an optional input device (not shown). The data store 508 may generally be any non-transitory computer-readable data store, including but not limited to hard drives, solid state devices, magnetic media, flash memory, and the like. In some embodiments, the data store 508 may be implemented as a database, web service, or cloud computing service, and may be external to the stateless NAT device 122. Additionally, in various embodiments, the data store 508 may be implemented as a single data store or distributed across multiple data stores.

The memory 520 may contain computer program instructions (grouped as modules in some embodiments) that the processor 502 executes in order to implement one or more aspects of the present disclosure. The memory 520 generally includes random access memory (RAM), read only memory (ROM) and/or other persistent, auxiliary or non-transitory computer readable media. The memory 520 may store an operating system 522 that provides computer program instructions for use by the processor 502 in the general administration and operation of the stateless NAT device 122. The memory 520 may further include computer program instructions and other information for implementing aspects of the present disclosure. In addition, the memory 520 may include and/or communicate with one or more data repositories (not shown), for example, to access user program codes and/or libraries.

In the illustrated embodiment, the memory 520 includes an IPv6 address encoder module 524, which may implement aspects of the present disclosure such as carrying out all or part of the network address encoding routine 400 described in FIG. 4A. The memory 520 further includes an IPv6 address decoder module 526, which may implement aspects of the present disclosure such as carrying out all or part of the network address decoding routine 450 described in FIG. 4B. In some embodiments, the IPv6 address encoder module 524 and IPv6 address decoder module 526 may be implemented as a single module.

The memory 520 further includes a device-specific routing prefix 302, which may be generated by the stateless NAT device 122, received from external computing devices, retrieved from a data store 508 or a common data store, or combinations thereof. In some embodiments, as described above, the device-specific IPv6 prefix may be generated based on characteristics of the stateless NAT device 122, such as a device serial number, network address, boot time, or other characteristic. Additionally, in various embodiments, the device-specific routing prefix 302 may uniquely identify the stateless NAT device 122 or may be associated with a group of stateless NAT devices 122.

The memory 520 further includes source device information 314 and target device information 316, which may be obtained and used by the IPv6 address encoder module 524 and the IPv6 address decoder module 526 as these modules carry out their respective functions. For example, the IPv6 address encoder module 524 may obtain the source device information 314 and the target device information 316 when processing a request to transmit data to a target computing device, or the IPv6 address decoder module 526 may obtain the source device information 314 and target device information 316 by decoding an encoded IPv6 address.

In some embodiments, the stateless NAT device 122 may include further components other than those illustrated in FIG. 5. For example, the memory 520 may include encoded IPv6 addresses, protocol information, data to be transmitted, requests to transmit data, data regarding other stateless NAT devices 122 (e.g., a table of such devices 122 and the device-specific IPv6 prefixes used by each), and other such information. FIG. 5 is thus understood to be illustrative but not limiting.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or through multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A network address translation ("NAT") device comprising:
   a data store configured to store computer-executable instructions; and
   a processor in communication with the data store, wherein the computer-executable instructions, when executed by the processor, configure the processor to:
      receive, from a source computing device associated with a source IPv4 address, a first communication request to transmit first data to a target port of a target computing device, wherein the first communication request is associated with a source port and a communications protocol, and wherein the target computing device is associated with a target IPv4 address and a target IPv6 address;
      generate an encoded IPv6 address, the encoded IPv6 address comprising a prefix associated with the NAT device, an encoding of the communication protocol, an encoding of the source IPv4 address, an encoding of the source port, an encoding of the target IPv4 address, and an encoding of the target port;
      transmit the first data to the target IPv6 address associated with the target computing device, wherein the NAT device uses the encoded IPv6 address when transmitting the first data;
      receive a second communication request from the target computing device at the target IPv6 address to transmit second data to the source computing device, wherein the second communication request is sent from the target IPv6 address associated with the target computing device, and wherein the second communication request is sent to the encoded IPv6 address;
      decode the encoded IPv6 address to obtain the communication protocol, source IPv4 address, source port, target IPv4 address, and target port; and
      transmit the second data to the source computing device at the source IPv4 address on the source port using the communication protocol, wherein the NAT device indicates to the source computing device that the second data was transmitted from the target port and target IPv4 address.

2. The NAT device of claim 1, wherein the data store is configured to store further computer-executable instructions that, when executed by the processor, configure the processor to obtain the target IPv6 address.

3. The NAT device of claim 1, wherein the NAT device is one of a plurality of NAT devices.

4. The NAT device of claim 3, wherein the prefix associated with the NAT device uniquely identifies the NAT device within the plurality of NAT devices.

5. The NAT device of claim 1, wherein the NAT device does not store the source IPv4 address, source port, target IPv4 address, target port, or communication protocol after encoding them into the encoded IPv6 address.

6. A computer-implemented method comprising:
   receiving, by a first network address translation ("NAT") device, a first communication request from a source computing device via a source port and a source IPv4 address, the first communication request including first data to be transmitted to a target port of a target computing device;
   generating, by the first NAT device, an encoded IPv6 address, the encoded IPv6 address comprising a prefix associated with the first NAT device, an encoding of the source IPv4 address, an encoding of the source port, an encoding of a target IPv4 address associated with the target computing device, and an encoding of the target port; and
   responsive to the first communication request, transmitting, by the first NAT device using the encoded IPv6 address, the first data to the target computing device via a target IPv6 address.

7. The computer-implemented method of claim 6, wherein the first communication request includes the target IPv4 address.

8. The computer-implemented method of claim 6, wherein the first communication request is associated with a protocol.

9. The computer-implemented method of claim 8, wherein the encoded IPv6 address includes an encoding that identifies the protocol.

10. The computer-implemented method of claim 8, wherein the first data is transmitted to the target computing device using the protocol.

11. The computer-implemented method of claim 6 further comprising:
   receiving, at the encoded IPv6 address, a second communication request to transmit second data to the source computing device;
   decoding the encoded IPv6 address to obtain the source IPv4 address and source port; and
   transmitting the second data to the source computing device via the source IPv4 address and the source port.

12. The computer-implemented method of claim 11, wherein the second communication request is received at the encoded IPv6 address by the first NAT device.

13. The computer-implemented method of claim 11, wherein the second communication request is received at the encoded IPv6 address by a second NAT device.

14. The computer-implemented method of claim 13, wherein the second NAT device identifies the first NAT device based at least in part on the prefix in the encoded IPv6 address, and wherein the second NAT device forwards the second communication request to the first NAT device.

15. The computer-implemented method of claim 13, wherein the second NAT device transmits the second data to the source computing device.

16. A non-transitory computer-readable medium storing computer-executable instructions that, when executed by a network address translation ("NAT") device, configure the NAT device to perform operations including:
   receiving, at an encoded IPv6 address, a communication request from a target computing device to transmit data to a source computing device, wherein the encoded IPv6 address comprises an encoding of an IPv4 address of the target computing device, an encoding of an IPv4 address of the source computing device, and an encoding of a port associated with communications between the source computing device and the target computing device;
   decoding the encoded IPv6 address to obtain the IPv4 address of the source computing device and the port associated with communications between the source computing device and the target computing device; and transmitting the data to the IPv4 address of the source computing device using the port associated with communications between the source computing device and the target computing device.

17. The non-transitory computer-readable medium of claim 16, wherein the encoded IPv6 address includes a protocol associated with communications between the source computing device and the target computing device, and wherein the non-transitory computer-readable medium stores further computer-executable instructions that, when executed by the NAT device, configure the NAT device to perform further operations including:

decoding the encoded IPv6 address to obtain the protocol associated with communications between the source computing device and the target computing device, wherein the data is transmitted to the source computing device using the protocol.

18. The non-transitory computer-readable medium of claim 16, wherein the encoded IPv6 address includes a prefix associated with the NAT device.

19. The non-transitory computer-readable medium of claim 16, wherein the encoded IPv6 address was generated in response to a communication request from the source computing device.

20. The non-transitory computer-readable medium of claim 16, wherein the encoded IPv6 address includes an encoding of a port associated with communications between the source computing device and the target computing device.

\* \* \* \* \*